No. 680,793. Patented Aug. 20, 1901.
B. G. LAMME.
DYNAMO ELECTRIC GENERATOR.
(Application filed June 28, 1900.)
(No Model.)
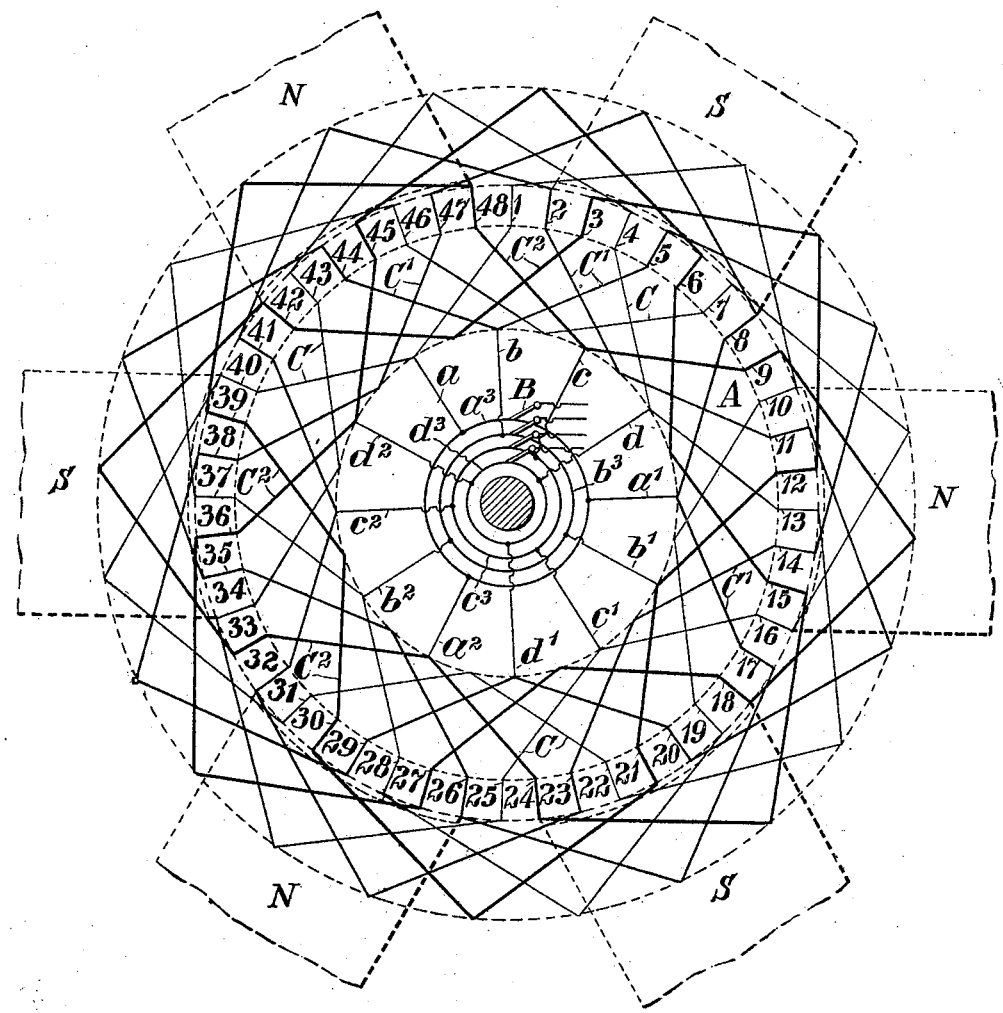
WITNESSES:
C. L. Belcher
Birney Hines
INVENTOR
Benjamin G. Lamme
BY
Herley G. Carr
ATTORNEY.
THE NORRIS PETERS CO., PHOTO-LITHO., WASHINGTON, D. C.

UNITED STATES PATENT OFFICE.

BENJAMIN G. LAMME, OF PITTSBURG, PENNSYLVANIA, ASSIGNOR TO THE WESTINGHOUSE ELECTRIC & MANUFACTURING COMPANY, OF PENNSYLVANIA.

DYNAMO-ELECTRIC GENERATOR.

SPECIFICATION forming part of Letters Patent No. 680,793, dated August 20, 1901.

Application filed June 28, 1900. Serial No. 22,003. (No model.)

*To all whom it may concern:*

Be it known that I, BENJAMIN G. LAMME, a citizen of the United States, residing at Pittsburg, in the county of Allegheny and State of Pennsylvania, have invented new and useful Improvements in Dynamo-Electric Generators, of which the following is a specification.

My invention relates to dynamo-electric generators, and particularly to machines of this character employed for generating alternating currents.

The object of my invention is to provide a generator of the type above indicated which shall have certain advantages over those heretofore designed and employed in similar relations. Among such advantages are the utilization of an armature which has a large number of slots and a small number of conductors per circuit; one which may have as many circuits in parallel as may be desired without regard to the number of field-magnet poles; one in which each circuit is uniformly distributed entirely around the armature periphery; one in which the coils are so constructed and arranged that in case of accident to any winding the remaining windings will be uniformly distributed and may therefore be used satisfactorily; one in which the windings may be used independently for separate circuits, if desired; one in which part of the windings may be reversed when the number of circuits is an odd number, so as to provide a symmetrical arrangement, and one in which the difference of potential between adjacent end conductors is less than that between the end conductors of any one of the windings that are nearest to each other.

In order to secure the advantages above enumerated, I provide the means shown in the accompanying drawing, the single figure of which is a diagrammatic view of an armature and portions of the pole-pieces of the field-magnet of a two-phase alternating-current generator, the pole-pieces being indicated by broken lines.

For convenience and simplicity of illustration I have indicated the generator as provided with only six field magnetic pole-pieces, which are alternately designated by the letters N and S. In practice, however, a much larger number of pole-pieces will be employed, it being well understood that in alternating-current generators a comparatively large number of pole-pieces of relatively small width is desirable in order to secure the desired rate of alternations without running the armature at an excessively high speed.

The armature A will in practice preferably be of the drum type, having slots extending parallel to its axis and of sufficient depth to receive the coils, the portions of the coils located at the ends of the armature and outside of the slots being either formed as integral continuations of the conductors located in the slots or being in the form of connectors bolted or riveted and soldered to the ends of the conductors which project from the slots, as may be found convenient and desirable, both forms of winding being well known in the art.

In order that the winding may be clearly illustrated, I have indicated the core-slots and the conductors located therein by radial lines designated, respectively, by the numerals 1 to 48, inclusive. These conductors 1 to 48 are connected at the respective ends of the armature-core by end conductors, which, as hereinbefore stated, may be either separate connectors or integral parts of the slot-conductors, so as to form a plurality of independent closed coil-windings, three of these windings being embodied in the machine illustrated in the drawing. The three windings C, C', and $C^2$ are indicated by lines of different width, and all are connected together in parallel at the brushes B by means of wires $a\ a'\ a^2$, $b\ b'\ b^2$, $c\ c'\ c^2$, and $d\ d'\ d^2$ and the corresponding collector-rings $a^3$, $b^3$, $c^3$, and $d^3$. It will be observed that the conductors of the several windings are so disposed and connected that conductors subjected to the same magnetic conditions are joined to the same collector-ring, and consequently that the machine is in perfect balance electrically and magnetically, and since each of the windings is symmetrically distributed about the armature if any one of the windings becomes disabled or destroyed the operation of the others will not be disturbed.

It will be understood without further illustration that my invention is equally well adapted for use in connection with generators having stationary armatures and rotary field-magnets, such machines being well known in the art.

While I have shown my invention as applied to a generator of two-phase currents, I desire it to be understood that it is applicable to and may be used in connection with generators of single-phase currents, or of currents the phases of which are greater in number than two.

I claim as my invention—

1. An alternating-current dynamo-electric generator having an armature provided with a plurality of independent, closed coil-windings uniformly distributed around a single core and connected in parallel to the distributing circuit or circuits.

2. An alternating-current dynamo-electric generator having an armature provided with a plurality of closed coil-windings uniformly distributed around a single core and symmetrically-disposed leads for connecting said windings together in parallel at the distributing-circuit terminals.

3. An alternating-current dynamo-electric generator having a plurality of armature-windings uniformly distributed around a single core, each of which is closed upon itself and all of which are connected together in parallel at the distributing-circuit terminals.

4. An alternating-current dynamo-electric generator having an armature provided with a plurality of symmetrically-distributed, closed coil-windings and with means for connecting to the terminals in parallel such points in the several windings as have substantially the same relation to the poles of the magnetic field of the machine.

5. A polyphase dynamo-electric generator having a plurality of closed coil-windings symmetrically disposed and a plurality of terminals to which said windings are connected in parallel.

In testimony whereof I have hereunto subscribed my name this 26th day of June, 1900.

BENJ. G. LAMME.

Witnesses:
WESLEY G. CARR,
BIRNEY HINES.